United States Patent [19]
Fredrick

[11] 3,842,948
[45] Oct. 22, 1974

[54] DISC BRAKES

[75] Inventor: Ralph Nigel Douglas Fredrick, Bromsgrove, England

[73] Assignee: Girling Limited, Birmingham, England

[22] Filed: Dec. 4, 1972

[21] Appl. No.: 311,563

Related U.S. Application Data

[63] Continuation of Ser. No. 106,738, Jan. 15, 1971, abandoned.

[30] Foreign Application Priority Data
Jan. 28, 1970  Great Britain...................... 4033/70

[52] U.S. Cl.................. 188/71.4, 188/72.2, 192/70
[51] Int. Cl............................................. F16d 55/04
[58] Field of Search ........ 188/71.3, 71.4, 71.5, 722; 192/70, 70.23

[56] References Cited
UNITED STATES PATENTS
3,583,529   1/1971   Robinson........................... 188/71.4

*Primary Examiner*—George E. A. Halvosa
*Attorney, Agent, or Firm*—Scrivener Parker Scrivener & Clarke

[57] ABSTRACT

In a disc brake of the kind in which rotatable friction discs are brought into engagement with opposed surfaces in a stationary housing by axial separation of cooperating pressure plates located between the friction discs, balls being housed in complementary inclined recesses in the adjacent faces of the pressure plates, and on application of the brake the pressure plates move angularly with the friction discs until one plate is arrested by a stop, the other plate continuing to move angularly to produce a servo action, a non-rotating intermediate disc located between rotatable friction discs on at least one side of the pressure plates is permitted a limited angular movement and is arranged to transmit to the servo pressure plate the torque taken by the intermediate disc when the brake is applied.

4 Claims, 8 Drawing Figures

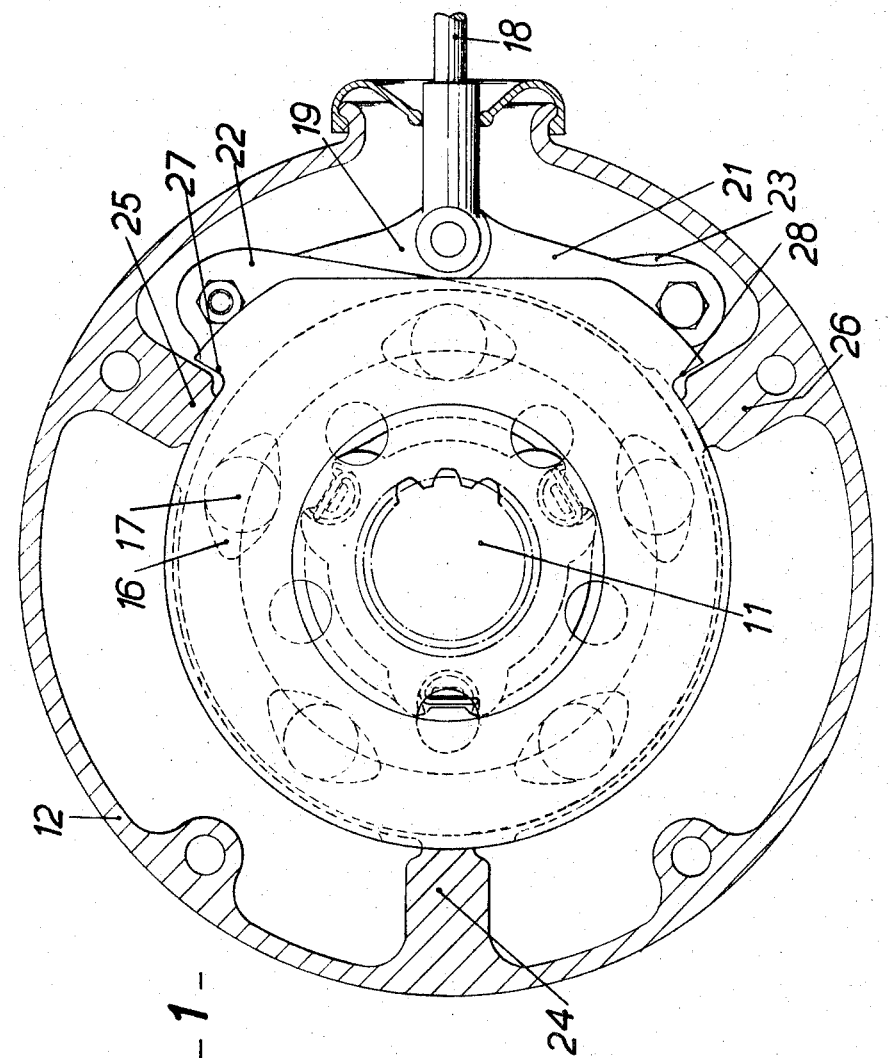
Fig-1-

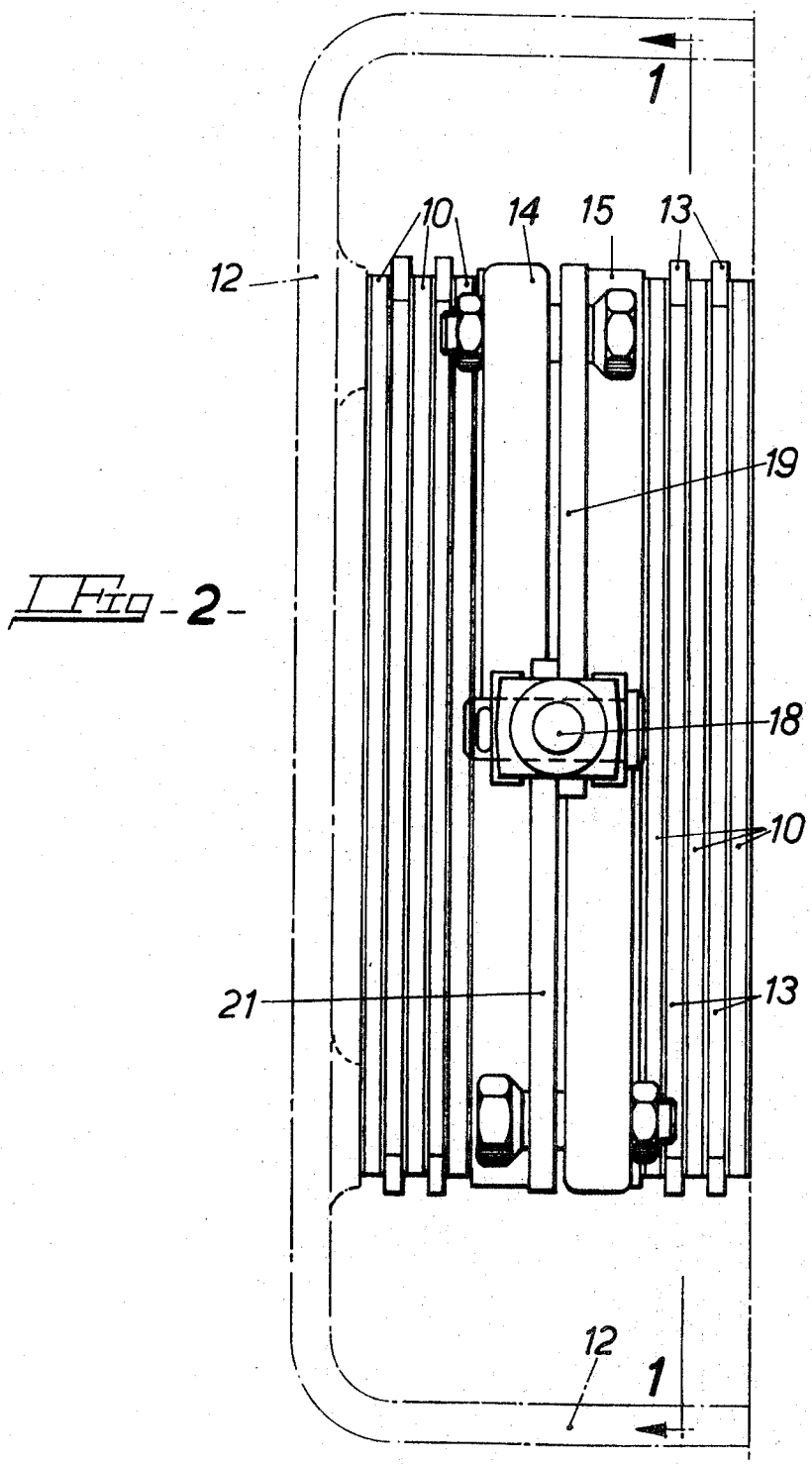

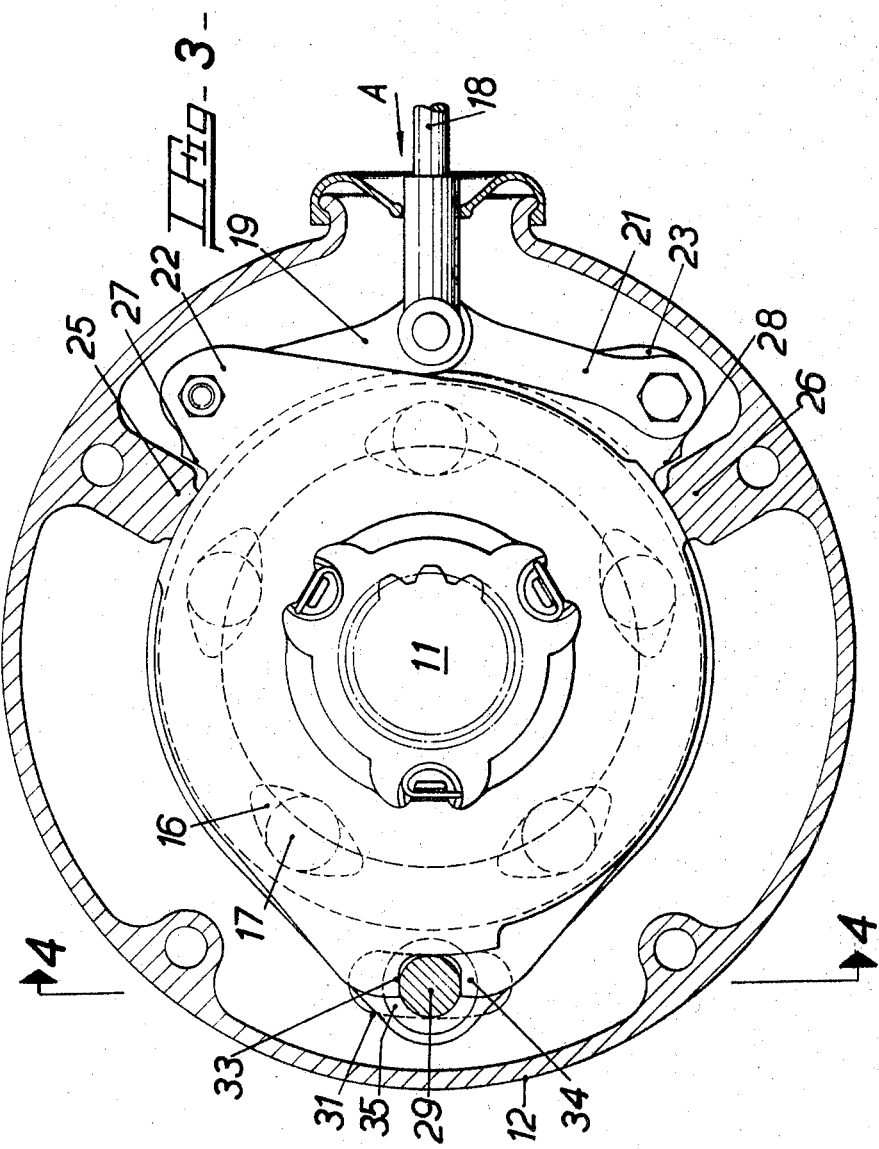

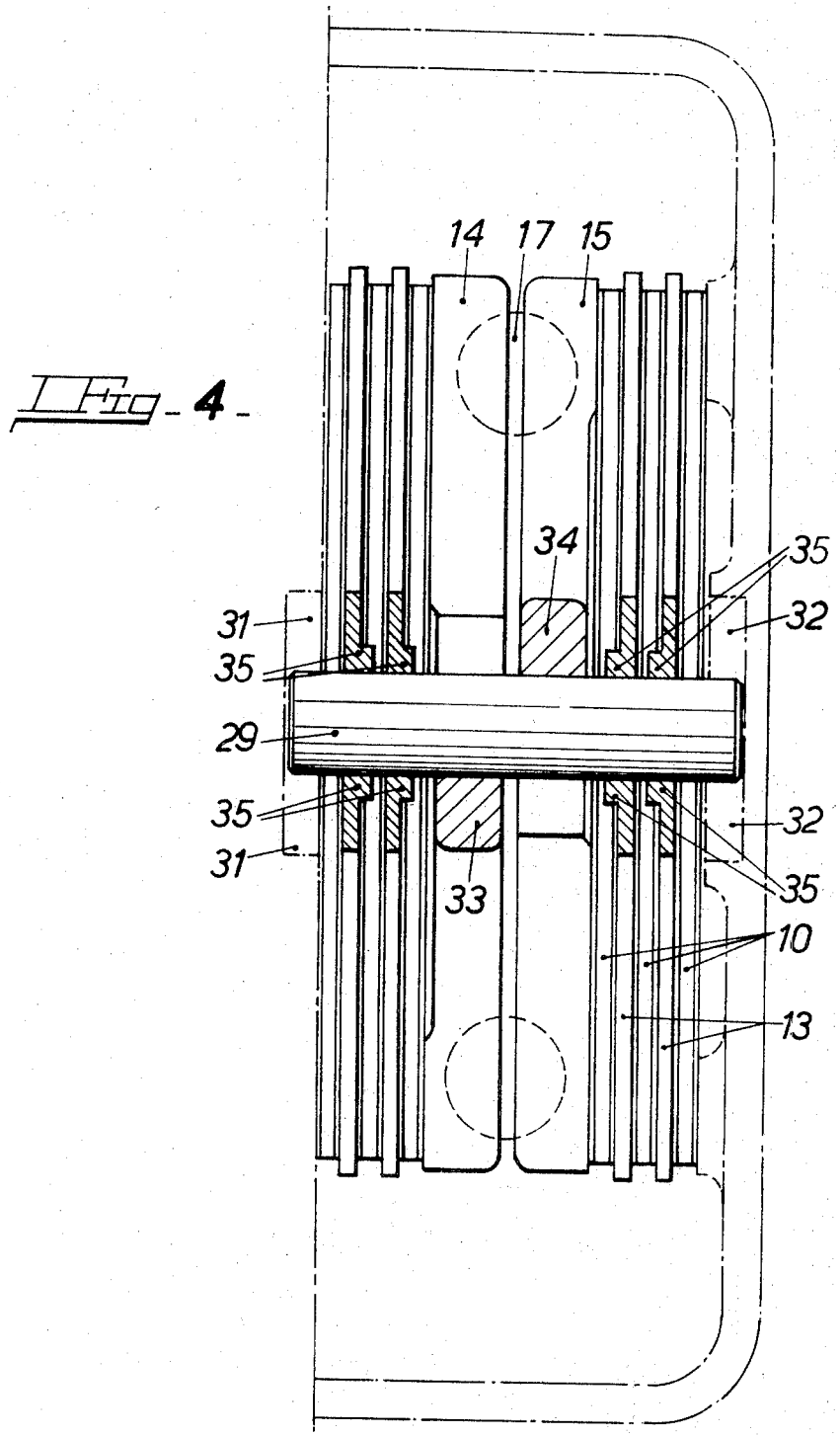

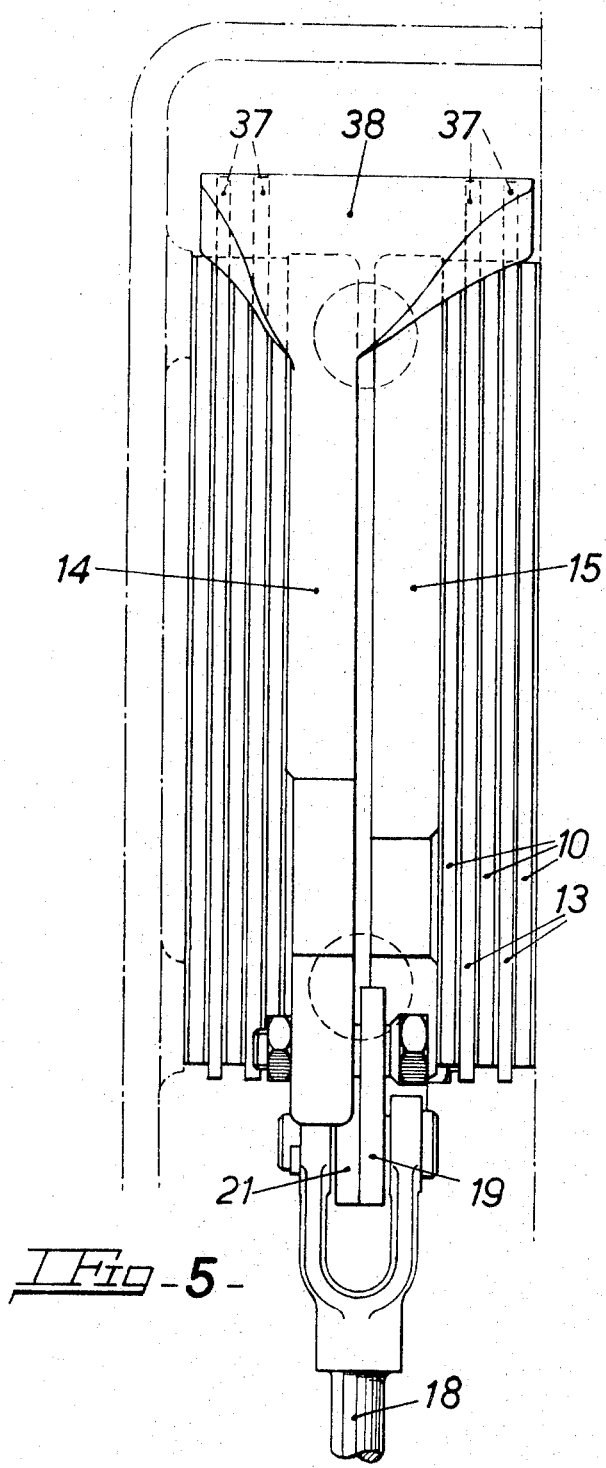

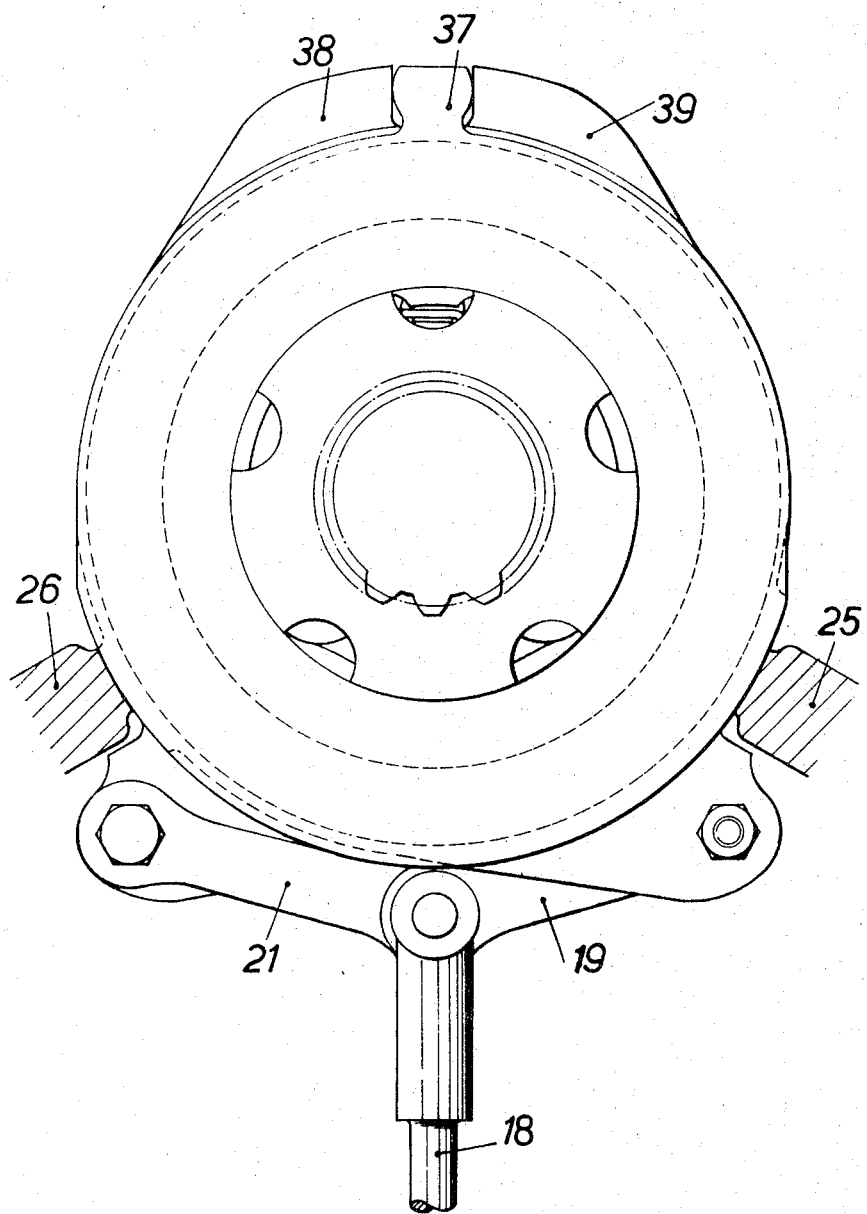

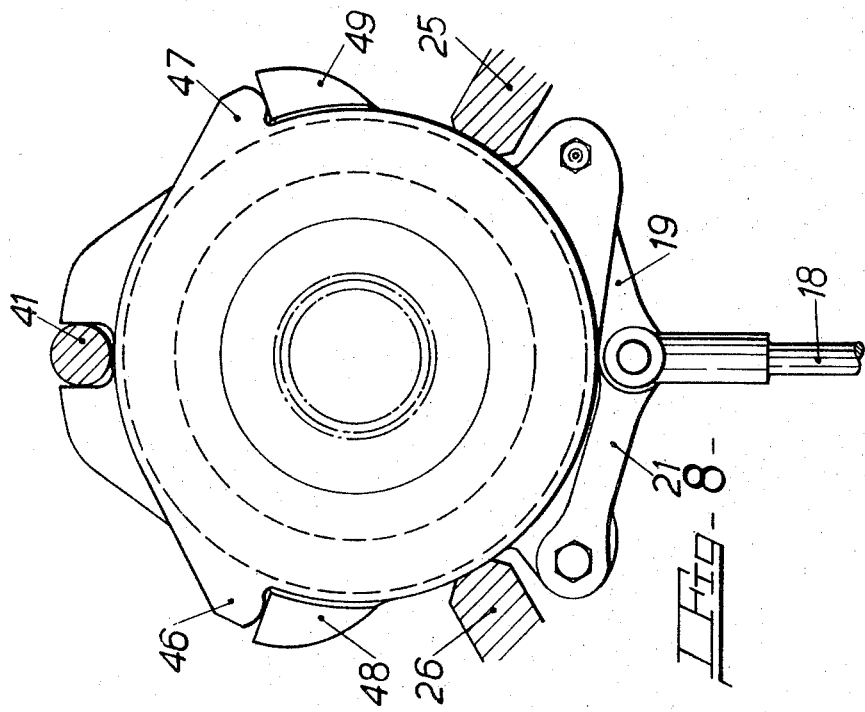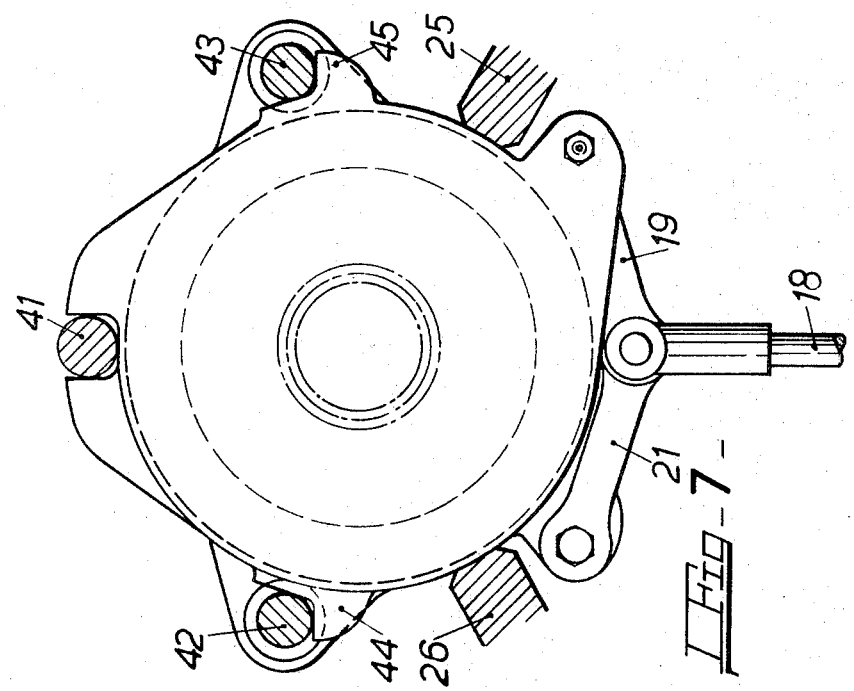

DISC BRAKES

This is a continuation of application Ser. No. 106,738 filed Jan. 15, 1971, now abandoned.

This invention relates to improvements in disc brakes of the kind in which rotatable friction discs are adapted to be brought into engagement with opposed radial surfaces in a stationary housing by pressure plates located between the friction discs. Balls are located in co-operating oppositely inclined recesses in the adjacent faces of the pressure plates and the application of the brake is initiated by moving the pressure plates angularly in opposite directions, the pressure plates then moving apart into engagement with the friction discs which are urged into engagement with the radial surfaces in the housing. The pressure plates are carried round with the friction discs until one is arrested by the engagement of a lug on the plate with a stop abutment in the housing and the continued angular movement of the other pressure plate provides a servo action.

The stationary radial surfaces are usually formed by end walls of the housing, the friction discs being splined or otherwise slidably keyed on a rotatable shaft passing axially through the housing. There may be a single friction disc between each pressure plate and an end wall of the housing or there may be two or more friction discs alternating with stationary intermediate discs keyed against rotation.

In existing brakes of this kind, however many friction discs and intermediate discs are incorporated in the brake, and assuming that the total torque when the brake is applied is divided equally between the discs, the torque available for moving the servo pressure plate angularly is only one half that generated by the friction disc in contact with the pressure plate, the other half being transmitted to the brake housing through the intermediate disc on the outer side of the friction disc. The clamping load is therefore independent of the number of friction discs and intermediate discs.

According to our invention, in a disc brake of the kind set forth incorporating two or more friction discs and at least one intermediate disc on one or each side of the pressure plates the intermediate disc or each of the intermediate discs is permitted a limited angular movement and the torque on it when the brake is applied is transmitted to the servo pressure plate.

This may be arranged in various ways.

In one arrangement a torque take-off pin is mounted for limited circumferential movement in an arcuate or kidney-shaped slot in the brake housing diametrically opposite the means for initiating the angular movement of the pressure plates in the application of the brake.

The intermediate discs and the pressure plates carry lugs co-operating with the pin so that the intermediate discs transmit torque through the pin to whichever of the pressure plates is acting as the servo plate according to the direction of rotation of the friction discs.

An example of that arrangement and some modifications are illustrated in the accompanying drawings in which:

FIG. 1 is a section of a normal brake in a plane at right angles to the axis of the brake, the section being taken on the line 1—1 of FIG. 2;

FIG. 2 is a view in the direction of the arrow A in FIG. 1 with the brake housing in chain dotted lines;

FIG. 3 is a section similar to FIG. 1 of a brake embodying one form of our invention;

FIG. 4 is a section on the line 4—4 of FIG. 3;

FIG. 5 is a side elevation of a modification;

FIG. 6 is an end view of the brake shown in FIG. 5; and

FIGS. 7 and 8 are diagrammatic end views showing two further modifications.

FIGS. 1 and 2 show a standard type of multi-disc brake.

Friction discs 10 slidably splined on a rotatable shaft 11 passing axially through a stationary cylindrical housing 12 alternate with intermediate discs 13 slidably keyed against rotation in the housing. There are three friction discs and two intermediate discs on each side of a pair of pressure plates, 14, 15 having in their adjacent faces oppositely inclined recesses 16 in which are located balls 17 by which the pressure plates are urged apart on angular movement of one plate relative to the other. The application of the brake is initiated by a radial pull-rod 18 coupled by opposed toggle links 19, 21 to lugs 22, 23 on the pressure plates. The pressure plates are located centrally in the housing by angularly spaced lugs 24, 25, 26, the lugs 25 and 26 also forming stops co-operating with abutments on the pressure plates to arrest angular movement of one or other of the pressure plates according to the direction of rotation of the friction disc, the other pressure plate continuing to move angularly to produce a servo action. The lugs 25 and 26 also co-operate with abutments 27, 28 on the intermediate discs to hold these against rotation.

In the modified brake embodying our invention which is shown in FIGS. 3 and 4 the lug 24 on the housing is omitted and is replaced by a floating pin 29 of which the axis is parallel to that of the brake. The ends of the pin are guided in part-circumferential or kidney-shaped recesses 31, 32 in the end walls of the housing. The pin co-operates with opposed lugs 33, 34 on the pressure plates and passes through bosses 35 on radially projecting lugs on the intermediate discs 13 so that when the brake is in operation torque is transmitted from the intermediate discs through the pin to whichever pressure plate is acting as the servo plate. The other pressure plate is arrested in the normal way by engagement with one of the lugs 25, 26 in the housing which serves as a torque take-off means.

In the modification shown in FIGS. 5 and 6 one or each intermediate disc is formed with a radially projecting lug 37 which is located between radial abutment faces on lugs 38, 39 extending outwardly from the pressure plate, the dimensions of these lugs in an axial direction being substantially equal to the axial dimension of the assembly of discs.

In the modification shown in FIG. 7 a stop abutment for the pressure plates is formed by a fixed pin 41 diametrically opposite the pull-rod and torque is transmitted from the intermediate discs to the pressure plates by pins 42, 43 mounted in radially projecting lugs on the intermediate discs and adapted to engage radial faces on complementary lugs 44, 45 on the pressure plates.

In the variant shown in FIG. 8 lugs 46, 47 on the intermediate discs are adapted to engage lugs 48, 49 on the pressure plates.

Our invention is particularly applicable to oil-immersed brakes but can also be used in dry brakes.

I claim:

1. A disc brake of the kind in which friction discs rotatable in both directions are brought into engagement with opposed surfaces in a stationary housing by axial separation of co-operating pressure plates located between the friction discs and maintained in parallelism in the off position of the brake, balls being housed in complementary inclined recesses in the adjacent faces of the pressure plates, and on application of the brake the pressure plates move angularly with the friction discs until one plate is arrested by a stop, the other plate continuing to move angularly to produce a servo action, at least two rotatable friction discs on each side of said pressure plates and at least one intermediate disc location between adjacent friction discs on each side of said pressure plates, means affording an operative connection between all of said intermediate discs selectively to each of said pressure plates depending on the direction of rotation of the friction discs, said means being constructed and arranged that all of said intermediate discs on both sides of said pressure plates transmit torque in both directions of rotation of the friction discs to whichever pressure plate is acting as the servo plate while allowing relative rotational movement between said intermediate discs and whichever pressure plate is arrested by its stop according to the direction of rotation of the friction discs.

2. A disc brake as in claim 1 including a pin mounted for limited movement in a circumferential direction in said brake housing and co-operating with opposed lugs on the pressure plates and with a radially projecting part of each of said intermediate discs whereby on application of the brake torque taken by the intermediate discs is transmitted through said pin to the servo pressure plate.

3. A disc brake as in claim 1 wherein said stop for the pressure plates comprises a pin fixed in the brake housing, and wherein said operative connection comprises radially projecting lugs on the intermediate discs, and complementary lugs on the pressure plates cooperating with said lugs for transmitting torque from the intermediate discs to the servo pressure plate.

4. A disc brake as in claim 1 wherein said operative connection comprises radially projecting lugs on said intermediate discs located between radially projecting lugs on the pressure plates for transmitting torque from the intermediate discs to the servo pressure plate.

* * * * *